United States Patent
Tanno

(10) Patent No.: US 8,372,192 B2
(45) Date of Patent: Feb. 12, 2013

(54) FUEL CELL SEPARATOR

(75) Inventor: Fumio Tanno, Chiba (JP)

(73) Assignee: Nisshinbo Chemical Inc., Tokyo (JP)

( * ) Notice: Subject to any disclaimer, the term of this patent is extended or adjusted under 35 U.S.C. 154(b) by 0 days.

(21) Appl. No.: 13/376,423

(22) PCT Filed: Jul. 22, 2010

(86) PCT No.: PCT/JP2010/062332
§ 371 (c)(1),
(2), (4) Date: Dec. 6, 2011

(87) PCT Pub. No.: WO2011/010689
PCT Pub. Date: Jan. 27, 2011

(65) Prior Publication Data
US 2012/0077111 A1 Mar. 29, 2012

(30) Foreign Application Priority Data
Jul. 24, 2009 (JP) .................. 2009-173144

(51) Int. Cl.
*B28B 7/36* (2006.01)
*C04B 28/36* (2006.01)
*C09J 11/06* (2006.01)
*D21H 21/16* (2006.01)

(52) U.S. Cl. .............. 106/38.2; 106/285; 106/287.23; 106/287.28; 106/287.32; 106/287.2; 429/514

(58) Field of Classification Search .............. 106/38.2, 106/285, 287.23, 287.32, 287.2; 429/514
See application file for complete search history.

(56) References Cited

U.S. PATENT DOCUMENTS

| 5,759,804 A | 6/1998 | Godiska et al. |
| 7,786,225 B2 | 8/2010 | Yasumura et al. |

FOREIGN PATENT DOCUMENTS

| AU | 757196 B2 | 2/2003 |
| EP | 1023374 A1 | 8/2000 |
| JP | 2001-216976 A | 8/2001 |
| JP | 2001-520245 A | 10/2001 |
| JP | 2004-119346 A | 4/2004 |
| JP | 2004-259497 A | 9/2004 |
| JP | 2004-298202 A | 10/2004 |
| JP | 2004-346315 A | 12/2004 |
| JP | 2006-040728 A | 2/2006 |
| JP | 2006-156421 A | 6/2006 |
| JP | 2006-206790 A | 8/2006 |
| JP | 2008-016307 A | 1/2008 |
| JP | 2009-158118 A | 7/2009 |

OTHER PUBLICATIONS

International Search Report of PCT/JP2010/062332, mailing date Oct. 26, 2010.

*Primary Examiner* — Helen O Conley
(74) *Attorney, Agent, or Firm* — Westerman, Hattori, Daniels & Adrian, LLP

(57) ABSTRACT

Provided is a fuel cell separator that has excellent resistance to heat and hot water and has a glass transition temperature between 140° C. and 165° C. Said fuel cell separator is formed by curing a composition containing a graphite material and a binder component resin. The binder component resin contains a cresol novolac epoxy resin having a hydrolysable chlorine content of at most 450 ppm and an epoxy equivalent weight of 192-210 g/eq, a phenol resin having a hydroxyl equivalent weight of 103-106 g/eq, and an imidazole compound having a molecular weight between 140 and 180.

7 Claims, 1 Drawing Sheet

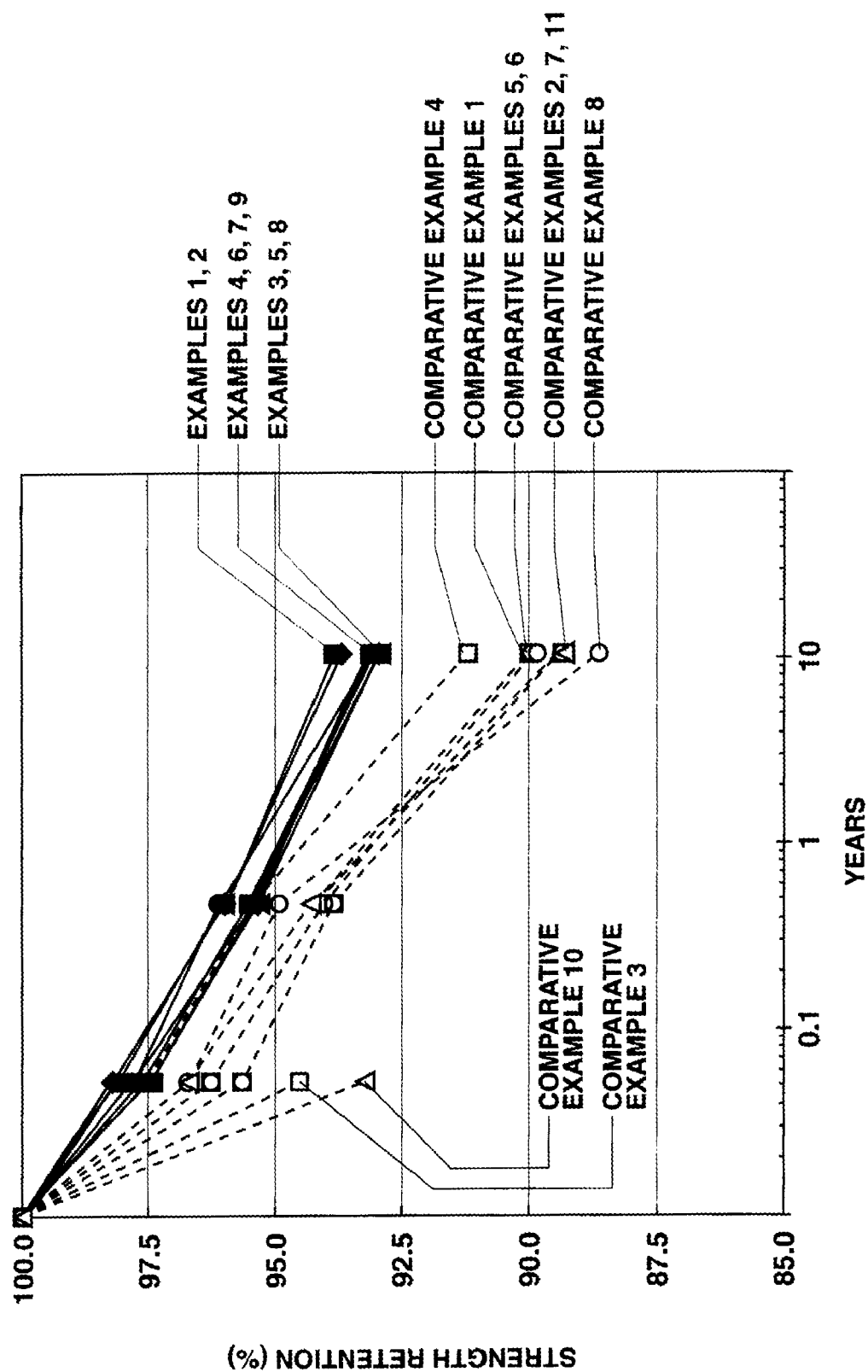

FUEL CELL SEPARATOR

TECHNICAL FIELD

The present invention relates to a fuel cell separator (bipolar plate), and more particularly to a fuel cell separator which has an excellent resistance to heat and hot water.

BACKGROUND ART

One role of the fuel cell separator is to confer each unit cell with electrical conductivity. In addition, separators provide flow channels for the supply of fuel and air (oxygen) to the unit cells and also serve as boundary walls separating the unit cells. Characteristics required of a separator thus include a high electrical conductivity, a high impermeability to gases, chemical stability and heat resistance. In household fuel cell applications in particular, long-term chemical stability is required.

Techniques for achieving these characteristics include the methods disclosed in Patent Documents 1 to 9.

However, in the methods of Patent Documents 1 and 2, because a resin having ester bonds is used in the fuel cell separator composition, hydrolysis may arise in the resin during power generation by the fuel cell, making the resistance of the fuel cell separator to hot water problematic. Moreover, curing of the composition takes a long time, and so these methods are also unsuitable for mass production.

In the methods of Patent Documents 3 to 7, because an epoxy resin having a high content of hydrolyzable chlorine is used in the fuel cell separator composition, the hydrolyzable chlorine lowers the crosslink density of the cured product, as a result of which the resulting fuel cell separator has insufficient heat resistance.

In the method of Patent Document 8, when triphenylphosphine is used as the cure accelerator, the resulting fuel cell separator has insufficient heat resistance. When 2-phenyl-4-methyl-5-hydroxymethylimidazole is used as the cure accelerator, owing to the poor compatibility between the accelerator and the epoxy resin, the curing reactions have difficulty proceeding, and so the resulting fuel cell separator has insufficient strength and heat resistance.

In the method of Patent Document 9, because triphenylphosphine is used as the cure accelerator, the resulting fuel cell separator has insufficient heat resistance.

Fuel cell separators are generally located in a working environment that is repeatedly subjected to wet heat and dry heat. When a fuel cell separator lacks adequate resistance to heat and hot water as in the case of the separators disclosed in each of the above patent documents, deformation and cracking sometimes arise during power generation within such an environment.

PRIOR-ART DOCUMENTS

Patent Documents

Patent Document 1: JP-A 2004-298202
Patent Document 2: JP-A 2004-346315
Patent Document 3: JP-A 2008-016307
Patent Document 4: JP-A 2006-206790
Patent Document 5: JP-A 2004-119346
Patent Document 6: JP-A 2001-216976
Patent Document 7: JP-A 2001-520245
Patent Document 8: JP-A 2004-259497
Patent Document 9: JP-A 2006-40728

SUMMARY OF THE INVENTION

Problems to be Solved by the Invention

It is therefore an object of the present invention to provide a fuel cell separator having an excellent resistance to heat and hot water.

Means for Solving the Problems

The inventor has conducted extensive investigations in order to achieve the above object. As a result, the inventor has discovered that by using a binder component resin containing a cresol novolak epoxy resin having a specific hydrolyzable chlorine content and a specific epoxy equivalent weight, a phenolic resin having a specific hydroxyl equivalent weight and an imidazole compound having a specific molecular weight, the glass transition point of the resulting fuel cell separator rises, endowing the separator with a good resistance to heat and hot water. The strength properties of the separator thus remain large for an extended period of time, helping to prevent damage.

Accordingly, the invention provides:

1. A fuel cell separator obtained by curing a composition comprising a binder component resin comprised of a cresol novolak epoxy resin having a hydrolyzable chlorine content of at most 450 ppm and an epoxy equivalent weight of 192 to 210 g/eq, a phenolic resin having a hydroxyl equivalent weight of 103 to 106 g/eq and an imidazole compound having a molecular weight between 140 and 180, and comprising a graphite material, wherein the separator has a glass transition point between 140 and 165° C.;
2. The fuel cell separator according to 1, wherein the hydrolyzable chlorine content is from 370 to 450 ppm;
3. The fuel cell separator according to 1 or 2, wherein the cresol novolak epoxy resin has an ICI viscosity at 150° C. of from 0.15 to 1.10 Pa·s;
4. The fuel cell separator according to any one of 1 to 3 which has a strength retention after 3,000 hours immersion in 125° C. water of between 92 and 95%;
5. The fuel cell separator according to any one of 1 to 4 which has a strength retention after 1,500 hours immersion in 90° C. water of between 95 and 98%;
6. The fuel cell separator according to any one of 1 to 5, wherein the imidazole compound is an aromatic ring-containing imidazole compound; and
7. The fuel cell separator according to any one of 1 to 6 which contains from 21 to 33 parts by weight of the binder component resin per 100 parts by weight of the graphite material.

Advantageous Effects of the Invention

The invention provides a fuel cell separator which has an excellent resistance to heat and hot water, and is thus able to maintain the necessary strength properties over an extended period of time.

BRIEF DESCRIPTION OF THE DIAGRAM

FIG. 1 is a graph showing the change over time in strength retention when the times in strength retention tests on fuel cell separators obtained in the respective examples of the invention and the comparative examples were converted to the corresponding times at a fuel cell operating temperature of 75° C.

EMBODIMENT FOR CARRYING OUT THE INVENTION

The invention is described more fully below.

The fuel cell separator of the invention is obtained by curing a composition which includes a binder component resin containing a cresol novolak epoxy resin having a hydrolyzable chlorine content of at most 450 ppm and an epoxy equivalent weight of 192 to 210 g/eq, a phenolic resin having a hydroxyl equivalent weight of 103 to 106 g/eq and an imidazole compound having a molecular weight between 140 and 180, and also includes a graphite material. The separator has a glass transition point between 140 and 165° C.

Here, at a glass transition point below 140° C., the heat resistance of the separator becomes inadequate. On the other hand, at a glass transition point above 165° C., the crosslink density becomes high, making the fuel cell separator hard and brittle. The glass transition point is more preferably between 150 and 165° C.

In the invention, to improve the resistance of the resulting fuel cell separator to heat and hot water, the cresol novolak epoxy resin used is one having a hydrolyzable chlorine content of not more than 450 ppm.

At a hydrolyzable chlorine content of not more than 450 ppm, the crosslink density of the cured product increases, improving the heat resistance of the resulting separator. On the other hand, although no particular lower limit is imposed on the hydrolyzable chlorine content, because epoxy resin having a hydrolyzable chlorine content below 370 ppm is very expensive, based on cost considerations, it is preferable for the hydrolyzable chlorine content to be not less than 370 ppm.

To further increase the heat resistance of the resulting fuel cell separator, the epoxy equivalent weight of the cresol novolak epoxy resin is preferably from 192 to 210 g/eq, more preferably from 193 to 210 g/eq, and even more preferably from 198 to 210 g/eq.

By using an epoxy resin with an epoxy equivalent weight in this range, the resin has a suitable molecular weight and the cured product has an increased crosslink density, enabling the heat resistance of the fuel cell separator to be improved even further.

To further increase the heat resistance of the resulting fuel cell separator and also provide a good processability, the cresol novolak epoxy resin has an ICI viscosity at 150° C. of preferably from 0.15 to 1.10 Pa·s, more preferably from 0.17 to 1.05 Pa·s, and even more preferably from 0.24 to 1.05 Pa·s.

When an epoxy resin with an ICI viscosity in this range is used, the resin has a suitable molecular weight, giving the resulting fuel cell separator a good heat resistance. Moreover, the resin has good flow properties, and thus a good processability (e.g., the pressure during molding can be lowered).

The cresol novolak epoxy resin used in the invention may be a resin of any of the following types: ortho-, meta-, para-, and high-ortho- (having a higher proportion of methylene bonds at ortho positions) cresol novolak epoxy resins. Of these, ortho-cresol novolak epoxy resins and high ortho-cresol novolak epoxy resins are preferred.

The phenolic resin which serves as the epoxy resin curing agent is not subject to any particular limitation. However, to further increase the heat resistance of the resulting separator, a phenolic resin having a hydroxy equivalent weight of from 103 to 106 g/eq is preferred.

By using a phenolic resin having a hydroxyl equivalent weight in this range, the resin has an appropriate molecular weight and the cured product has an increased crosslink density, enabling an even greater improvement in the heat resistance of the resulting fuel cell separator.

Based on these considerations, the phenolic resin is most preferably a novolak phenolic resin.

The phenolic resin is included in an amount which, in order to prevent the residual presence of unreacted ingredient, is preferably between 0.98 and 1.02 equivalents per equivalent of the cresol novolak epoxy resin.

By setting the amount of phenolic resin in this range, little unreacted ingredient (epoxy resin or phenolic resin) will remain, making it possible to prevent the undesirable effect of unreacted ingredients leaching out during power generation.

In the invention, an imidazole compound is used as the cure accelerator. From the standpoint of increasing the thermal stability of the binder component resin so as to keep the curing reactions from suddenly proceeding within the mold during molding of the fuel cell separator and thus prevent the melt viscosity and molding pressure from rising, and also to ensure a suitable activity as an accelerator, it is preferable for the imidazole compound to have a molecular weight of between 140 and 180.

Suitable, non-limiting, examples of such imidazole compounds include aromatic ring-containing imidazole compounds such as 1-phenylimidazole, 1-(2-chlorophenyl)imidazole, 1-(3-chlorophenyl)imidazole, 1-(4-chlorophenyl)imidazole, 1-(3-fluorophenyl)imidazole, 1-(4-fluorophenyl)imidazole, 1-(4-methoxyphenyl)imidazole, 1-(o-tolyl)imidazole, 1-(m-tolyl)imidazole, 1-(3,5-dimethylphenyl)imidazole, 2-phenylimidazole, 2-phenyl-4-methylimidazole, 2-(4-chlorophenyl)imidazole, 2-(4-fluorophenyl)imidazole, 5-phenylimidazole, 5-(2-chlorophenyl)imidazole, 5-(3-chlorophenyl)imidazole, 5-(4-chlorophenyl)imidazole, 5-(2-fluorophenyl)imidazole, 5-(3-fluorophenyl)imidazole, 5-(4-fluorophenyl)imidazole, 5-(2-methoxyphenyl)imidazole, 5-(3-methoxyphenyl)imidazole, 5-(4-methoxyphenyl)imidazole, 5-(o-tolyl)imidazole, 5-(m-tolyl)imidazole, 5-(p-tolyl)imidazole and 1-benzyl-2-methylimidazole. Of these, 2-phenylimidazole, 2-phenyl-4-methylimidazole and 1-benzyl-2-methylimidazole are preferred. The imidazole compound may be used singly or as a combination of two or more thereof.

To have the curing reactions proceed smoothly and efficiently, it is preferable for the amount of imidazole compound included to be set to from 0.65 to 1.02 parts by weight per 100 parts by weight of the mixture of the cresol novolak epoxy resin and the phenolic novolak resin.

By setting the amount of imidazole compound in this range, the binder component curing reactions can be made to proceed rapidly and to a sufficient degree, in addition to which, because the binder component resin has a better thermal stability, during molding, the curing reactions can be prevented from proceeding suddenly within the mold, causing the melt viscosity to rise. Moreover, the curing reactions can be kept from proceeding during storage.

The graphite material is not subject to any particular limitation. Illustrative examples include natural graphite (e.g., vein, flake, amorphous), synthetic graphite obtained by firing needle coke, synthetic graphite obtained by firing vein coke, graphite obtained by grinding electrodes to a powder, coal pitch, petroleum pitch, coke, activated carbon, glassy carbon, acetylene black and Ketjenblack.

Of these, flake-type natural graphite is preferred from the standpoint of enabling a further increase in the resistance of the resulting fuel cell separator to heat and hot water.

The average particle size of the graphite material is not subject to any particular limitation, although it is preferable for the median size (d50) in the particle size distribution to be from about 20 to about 60 μm.

The average particle size is a value measured with a particle size analyzer (available from Nikkiso Co., Ltd.).

In manufacturing the fuel cell separator of the invention, in addition to the above binder component resin and graphite material, an internal mold release agent may also be included.

The internal mold release agent is not subject to any particular limitation. Use may be made of various internal mold release agents that have hitherto been employed in molding fuel cell separators, including metal soaps such as calcium stearate and zinc stearate, synthetic hydrocarbon waxes such as polyethylene wax, and long-chain fatty acids such as carnauba wax. These may be used singly or as combinations of two or more thereof.

The graphite material and the binder component resin are used in relative amounts of preferably 21 to 33 parts by weight, more preferably 24 to 30 parts by weight, and even more preferably 26 to 28 parts by weight, of the binder component resin per 100 parts by weight of the graphite material.

By setting the amount of binder component resin in this range, the molding material has suitable flow properties, resulting in a good moldability, in addition to which an excessive decline in the electrical conductivity of the resulting fuel cell separator can be prevented.

When an internal mold release agent is used, the amount included per 100 parts by weight of the graphite material is preferably from about 0.05 to about 1.0 part by weight, more preferably from 0.1 to 0.8 part by weight, and even more preferably from 0.3 to 0.7 part by weight.

By setting the amount of internal mold release agent in this range, demolding-related defects can be prevented, in addition to which plasticization of the binder component resin by the internal mold release agent and a decrease in the strength of the resulting separator can be prevented.

The fuel cell separator of the invention can be obtained by mixing together the respective above ingredients to form a composition, and molding the composition. Various methods known to the art may be employed as the method of preparing the composition and the method of molding the composition into a molded article.

For example, the composition may be prepared by mixing together the binder component resin, the graphite material and, optionally, the internal mold release agent in specific proportions and in any order. The mixer used at this time may be, for example, a planetary mixer, a ribbon blender, a Loedige mixer, a Henschel mixer, a rocking mixer or a Nauta mixer.

The method used to mold the separator may be, for example, injection molding, transfer molding, compression molding, extrusion or sheet molding.

The fuel cell separator of the invention may be advantageously used in particular as a separator for a solid polymer fuel cell.

A solid polymer fuel cell is generally composed of a stack of many unit cells, each of which is constructed of a solid polymer membrane disposed between a pair of electrodes that are in turn sandwiched between a pair of separators which form channels for the supply and removal of gases. The fuel cell separator of the invention may be used as some or all of the plurality of separators in the fuel cell.

EXAMPLES

Examples of the invention and comparative examples are given below by way of illustration and not by way of limitation.

The various properties in the following examples were measured by the following methods.

[1] Glass Transition Point

Using a thermal analyzer (TMA 6100, from Seiko Instruments), measurement was carried out at a ramp-up rate of 1° C./min and under a load of 5 g. The point of inflection on the resulting thermal expansion coefficient curve was treated as the glass transition point.

[2] Strength Tests

These tests were carried out using 60 mm×20 mm×2 mm test specimens cut out of the resulting fuel cell separator.

[Flexural Strength]

Using the above test specimens cut from separators that had just been molded, the flexural strength of the test piece at a distance between support points of 40 mm was measured in accordance with JIS K 6911 (General Test Methods for Plastics), and treated as the initial flexural strength.

[Strength Retention after Immersion in Hot Water]

Immersion in 90° C. Water: In each case, the test specimen and 400 mL of ion-exchanged water were placed in a 500 mL fluoroplastic vessel, and the interior was heated to 90° C. The test specimen was taken out after 168 hours or 1,500 hours, the flexural strength was measured, and the strength retention was calculated as the ratio of this flexural strength to the initial flexural strength was computed.

Immersion in 125° C. Water: In each case, the test specimen and 400 mL of ion-exchanged water were placed in a 500 mL SUS (stainless steel) pressure vessel, and the interior was heated to 125° C. The test specimen was taken out after 3,000 hours, the flexural strength was measured, and the strength retention was calculated as the ratio of this flexural strength to the initial flexural strength.

The above test conditions of 90° C. for 168 hours, 90° C. for 1,500 hours and 125° C. for 3,000 hours, according to Arrhenius's 10° C. doubling rule, correspond respectively to fuel cell operating times of 20 days, a half-year, and 11 years at an operating temperature of 75° C.

[3] Hydrolyzable Chlorine Concentration

After dissolving 0.5 g of epoxy resin in 20 mL of dioxane, 5 mL of a 1N solution of KOH in ethanol was added to the epoxy resin solution, and heating was carried out for 30 minutes under refluxing. The resulting solution, when cooled, was diluted with 80% acetone water, acidified by adding 2 mL of concentrated $HNO_3$, and subjected to potentiometric titration with 0.01 N $AgNO_3$. The value obtained was treated as the hydrolyzable chlorine concentration.

[4] ICI Viscosity

The melt viscosity at 150° C. was measured using a cone/plate type ICI viscometer. The measuring cone of the ICI viscometer was selected according to the specimen viscosity, a sample of the resin was set in place, and 90 seconds later the cone was rotated. The value indicated on the viscometer was read off 30 seconds after the start of cone rotation.

Example 1

One hundred parts by weight of flake graphite powder (average particle size: 30 μm at d50 in particle size distribution), a binder component resin composed of 18.3 parts by weight of o-cresol novolak epoxy resin (epoxy equivalent weight, 199 g/eq; ICI viscosity, 0.29 Pa·s; hydrolyzable chlorine concentration, 370 ppm), 9.6 parts by weight of novolak phenolic resin (hydroxyl equivalent weight, 103 g/eq; ICI viscosity, 0.22 Pa·s) and 0.19 part by weight of 2-phenylimidazole, and 0.5 part by weight of carnauba wax as the internal mold release agent were charged into a Henschel mixer and mixed together at 500 rpm for 3 minutes to prepare a fuel cell separator composition.

The resulting composition was charged into a 200 mm×200 mm mold for manufacturing a fuel cell separator and compression-molded at a mold temperature of 185·C and a molding pressure of 30 MPa for a molding time of 30 seconds, thereby giving a fuel cell separator.

Example 2

Aside from replacing the o-cresol novolak epoxy resin used in Example 1 with 18.1 parts by weight of another o-cresol novolak epoxy resin (epoxy equivalent weight, 193 g/eq; ICI viscosity, 0.17 Pa·s; hydrolyzable chlorine concentration, 390 ppm) and setting the amount of novolak phenolic resin to 9.8 parts by weight, a fuel cell separator composition was prepared and compression-molded under the same conditions as in Example 1 to give a fuel cell separator.

Example 3

Aside from replacing the o-cresol novolak epoxy resin used in Example 1 with 18.5 parts by weight of another o-cresol novolak epoxy resin (epoxy equivalent weight, 206 g/eq; ICI viscosity, 0.73 Pa·s; hydrolyzable chlorine concentration, 390 ppm) and setting the amount of novolak phenolic resin to 9.3 parts by weight, a fuel cell separator composition was prepared and compression-molded under the same conditions as in Example 1 to give a fuel cell separator.

Example 4

Aside from replacing the o-cresol novolak epoxy resin used in Example 1 with 18.7 parts by weight of another o-cresol novolak epoxy resin (epoxy equivalent weight, 210 g/eq; ICI viscosity, 1.02 Pa·s; hydrolyzable chlorine concentration, 450 ppm) and setting the amount of novolak phenolic resin to 9.2 parts by weight, a fuel cell separator composition was prepared and compression-molded under the same conditions as in Example 1 to give a fuel cell separator.

Comparative Example 1

Aside from replacing the o-cresol novolak epoxy resin used in Example 1 with 18.2 parts by weight of another o-cresol novolak epoxy resin (epoxy equivalent weight, 195 g/eq; ICI viscosity, 0.24 Pa·s; hydrolyzable chlorine concentration, 590 ppm) and setting the amount of novolak phenolic resin to 9.7 parts by weight, a fuel cell separator composition was prepared and compression-molded under the same conditions as in Example 1 to give a fuel cell separator.

Comparative Example 2

Aside from replacing the o-cresol novolak epoxy resin used in Example 1 with 18.0 parts by weight of another o-cresol novolak epoxy resin (epoxy equivalent weight, 191 g/eq; ICI viscosity, 0.06 Pa·s; hydrolyzable chlorine concentration, 370 ppm) and setting the amount of novolak phenolic resin to 9.8 parts by weight, a fuel cell separator composition was prepared and compression-molded under the same conditions as in Example 1 to give a fuel cell separator.

Comparative Example 3

Aside from replacing the o-cresol novolak epoxy resin used in Example 1 with 18.0 parts by weight of a novolak epoxy resin (epoxy equivalent weight, 191 g/eq; ICI viscosity, 0.53 Pa·s; hydrolyzable chlorine concentration, 480 ppm) and setting the amount of novolak phenolic resin to 9.8 parts by weight, a fuel cell separator composition was prepared and compression-molded under the same conditions as in Example 1 to give a fuel cell separator.

Comparative Example 4

Aside from replacing the o-cresol novolak epoxy resin used in Example 1 with 19.7 parts by weight of a dicyclopentadiene epoxy resin (epoxy equivalent weight, 246 g/eq; ICI viscosity, 0.23 Pa·s; hydrolyzable chlorine concentration, 550 ppm) and setting the amount of novolak phenolic resin to 8.3 parts by weight, a fuel cell separator composition was prepared and compression-molded under the same conditions as in Example 1 to give a fuel cell separator.

Various evaluation tests were carried out on the fuel cell separators obtained in Examples 1 to 4 and in Comparative Examples 1 to 4. The results are shown in Table 1.

TABLE 1

|  |  | Example | | | | Comparative Example | | | |
| --- | --- | --- | --- | --- | --- | --- | --- | --- | --- |
|  |  | 1 | 2 | 3 | 4 | 1 | 2 | 3 | 4 |
| Epoxy resin | Resin skeleton | o-cresol novolak | o-cresol novolak | o-cresol novolak | o-cresol novolak | o-cresol novolak | o-cresol novolak | novolak | Dicyclopentadiene |
|  | Epoxy equivalent weight (g/eq) | 199 | 193 | 206 | 210 | 195 | 191 | 191 | 246 |
|  | Hydrolyzable chlorine (ppm) | 370 | 390 | 390 | 450 | 590 | 370 | 480 | 550 |
|  | ICI viscosity (Pa·s) | 0.29 | 0.17 | 0.73 | 1.02 | 0.24 | 0.06 | 0.53 | 0.23 |
| Separator | Glass transition point (° C.) | 150 | 145 | 155 | 165 | 134 | 125 | 152 | 128 |
|  | Initial flexural strength (MPa) | 55 | 53 | 58 | 54 | 54 | 48 | 53 | 54 |
|  | Strength retention (%) (168 hrs immersion in 90° C. water) | 98.2 | 98.1 | 97.6 | 97.8 | 96.2 | 95.6 | 94.5 | 97.5 |

TABLE 1-continued

| | | Example | | | | Comparative Example | | |
|---|---|---|---|---|---|---|---|---|
| | 1 | 2 | 3 | 4 | 1 | 2 | 3 | 4 |
| Strength retention (%) (1,500 hrs immersion in 90° C. water) | 96.0 | 96.0 | 95.5 | 95.4 | 94.0 | 93.8 | —* | 95.4 |
| Strength retention (%) (3,000 hrs immersion in 125° C. water) | 93.7 | 93.8 | 92.9 | 93.1 | 90.0 | 89.3 | —* | 91.2 |

*Not measurable because strength retention after 168 hours immersion at 90° C. was below 95%.

As shown in Table 1, the fuel cell separators obtained in Examples 1 to 4 had glass transition points of at least 140° C., a flexural strength retention after 1,500 hours immersion in 90° C. water of 95 to 98%, and a flexural strength retention after 3,000 hours immersion in 125° C. water of 92 to 95%. It is apparent from these results that the resistance to both heat and hot water was excellent, and that the fuel cell separators were able to maintain their strength for an extended period of time.

By contrast, in Comparative Example 1, because the epoxy resin used had a hydrolyzable chlorine content in excess of 450 ppm, the composition had a low crosslink density. As a result, the glass transition point was low, and the flexural strength retention ratios following immersion in 90° C. water and 125° C. water were both low.

In Comparative Example 2, because the epoxy resin used had an epoxy equivalent weight below 192 g/eq, the molecular weight of the epoxy resin was low. As a result, the separator had a low glass transition point, and the flexural strength retention ratios following immersion in 90° C. water and 125° C. water were both low.

In Comparative Example 3, because a novolak epoxy resin was used, due to the influence of moisture absorption, the flexural strength retention ratio following 168 hours of immersion in 90° C. water was low.

In Comparative Example 4, because a long-chain dicyclopentadiene epoxy resin was used, the composition had a low crosslink density. As a result, the glass transition point was low, and the flexural strength retention ratios following immersion in 90° C. water and 125° C. water were both low.

Example 5

Aside from replacing the novolak phenolic resin used in Example 1 with 9.6 parts by weight of another novolak phenolic resin (hydroxyl equivalent weight, 103 g/eq; ICI viscosity, 0.10 Pa·s), a fuel cell separator composition was prepared and compression-molded under the same conditions as in Example 1 to give a fuel cell separator.

Example 6

Aside from setting the amount of o-cresol novolak epoxy resin to 18.2 parts by weight and replacing the novolak phenolic resin used in Example 1 with 9.7 parts by weight of another novolak phenolic resin (hydroxyl equivalent weight, 105 g/eq; ICI viscosity, 0.85 Pa·s), a fuel cell separator composition was prepared and compression-molded under the same conditions as in Example 1 to give a fuel cell separator.

Example 7

Aside from setting the amount of o-cresol novolak epoxy resin to 18.2 parts by weight and replacing the novolak phenolic resin used in Example 1 with 9.7 parts by weight of another novolak phenolic resin (hydroxyl equivalent weight, 106 g/eq; ICI viscosity, 0.10 Pa·s), a fuel cell separator composition was prepared and compression-molded under the same conditions as in Example 1 to give a fuel cell separator.

Comparative Example 5

Aside from setting the amount of o-cresol novolak epoxy resin to 18.1 parts by weight and replacing the novolak phenolic resin used in Example 1 with 9.8 parts by weight of another novolak phenolic resin (hydroxyl equivalent weight, 107 g/eq; ICI viscosity, 0.06 Pa·s), a fuel cell separator composition was prepared and compression-molded under the same conditions as in Example 1 to give a fuel cell separator.

Comparative Example 6

Aside from setting the amount of o-cresol novolak epoxy resin to 17.4 parts by weight and replacing the novolak phenolic resin used in Example 1 with 10.5 parts by weight of an o-cresol novolak phenolic resin (hydroxyl equivalent weight, 118 g/eq; ICI viscosity, 0.88 Pa·s), a fuel cell separator composition was prepared and compression-molded under the same conditions as in Example 1 to give a fuel cell separator.

Comparative Example 7

Aside from setting the amount of o-cresol novolak epoxy resin to 17.4 parts by weight and replacing the novolak phenolic resin used in Example 1 with 10.5 parts by weight of an o-cresol novolak phenolic resin (hydroxyl equivalent weight, 118 g/eq; ICI viscosity, 0.01 Pa·s), a fuel cell separator composition was prepared and compression-molded under the same conditions as in Example 1 to give a fuel cell separator.

Comparative Example 8

Aside from setting the amount of o-cresol novolak epoxy resin to 14.3 parts by weight and replacing the novolak phenolic resin used in Example 1 with 12.6 parts by weight of an aralkyl-modified phenolic resin (hydroxyl equivalent weight, 174 g/eq; ICI viscosity, 0.37 Pa·s), a fuel cell separator composition was prepared and compression-molded under the same conditions as in Example 1 to give a fuel cell separator.

Various evaluation tests were carried out on the fuel cell separators obtained in Examples 5 to 7 and in Comparative Examples 5 to 8. The results are shown in Table 2.

TABLE 2

|  |  | Example | | | | Comparative Example | | | |
| --- | --- | --- | --- | --- | --- | --- | --- | --- | --- |
|  |  | 1 | 5 | 6 | 7 | 5 | 6 | 7 | 8 |
| Phenolic resin | Resin skeleton | novolak | novolak | novolak | novolak | novolak | o-cresol novolak | o-cresol novolak | aralkyl-modified |
|  | Hydroxyl equivalent weight (g/eq) | 103 | 103 | 105 | 106 | 107 | 118 | 118 | 174 |
|  | ICI viscosity (Pa·s) | 0.22 | 0.10 | 0.85 | 0.10 | 0.06 | 0.88 | 0.01 | 0.37 |
| Separator | Glass transition point (°C.) | 150 | 145 | 160 | 140 | 132 | 134 | 125 | 130 |
|  | Initial flexural strength (MPa) | 55 | 53 | 58 | 54 | 54 | 54 | 48 | 53 |
|  | Strength retention (%) (168 hrs immersion in 90° C. water) | 98.2 | 97.5 | 97.4 | 97.8 | 96.2 | 96.2 | 95.6 | 96.7 |
|  | Strength retention (%) (1,500 hrs immersion in 90° C. water) | 96.0 | 95.3 | 95.5 | 96.1 | 94.2 | 94.0 | 93.8 | 94.9 |
|  | Strength retention (%) (3,000 hrs immersion in 125° C. water) | 93.7 | 92.9 | 93.1 | 93.1 | 89.9 | 89.8 | 89.3 | 88.6 |

As shown in Table 2, the fuel cell separators obtained in Examples 5 to 7 had glass transition points of at least 140° C., a flexural strength retention after 1,500 hours immersion in 90° C. water of 95 to 98%, and a flexural strength retention after 3,000 hours immersion in 125° C. water of 92 to 95%. It is apparent from these results that the resistance to both heat and hot water was excellent, and that the fuel cell separators were able to maintain their strength for an extended period of time.

By contrast, in Comparative Examples 5 to 8, because the phenolic resins used had hydroxyl equivalent weights greater than 106 g/eq, the compositions had low crosslink densities. As a result, the glass transition points were low, in addition to which the flexural strength retentions following immersion in 90° C. water and 125° C. water were both low.

Example 8

Aside from replacing the 2-phenylimidazole used in Example 1 with 2-phenyl-4-methylimidazole, a fuel cell separator composition was prepared and compression-molded under the same conditions as in Example 1 to give a fuel cell separator.

Example 9

Aside from replacing the 2-phenylimidazole used in Example 1 with 1-benzyl-2-methylimidazole, a fuel cell separator composition was prepared and compression-molded under the same conditions as in Example 1 to give a fuel cell separator.

Comparative Example 9

Aside from replacing the 2-phenylimidazole used in Example 1 with 2-ethyl-4-methylimidazole, a fuel cell separator composition was prepared under the same conditions as in Example 1. When this composition was compression-molded under the same conditions as in Example 1, the composition did not flow uniformly within the mold, making it impossible to obtain a fuel cell separator. It was confirmed that merely placing this composition under the same temperature conditions as in Example 1 causes curing reactions to suddenly occur.

Comparative Example 10

Aside from replacing the 0.19 part by weight of 2-phenylimidazole used in Example 1 with 0.27 part by weight of 2-phenyl-4,5-dihydroxymethylimidazole, a fuel cell separator composition was prepared under the same conditions as in Example 1. When this composition was compression-molded under the same conditions as in Example 1, the composition did not cure. By increasing the molding time in 30-second increments and identifying the point in time at which the hardness of the compressed composition becomes constant, it was possible to obtain a fuel cell separator in 600 seconds.

Comparative Example 11

Aside from replacing the 0.19 part by weight of 2-phenylimidazole used in Example 1 with 0.27 part by weight of triphenylphosphine, a fuel cell separator composition was prepared under the same conditions as in Example 1. When this composition was compression-molded under the same conditions as in Example 1, the composition did not cure. By increasing the molding time in 30-second increments and identifying the point in time at which the hardness of the compressed composition becomes constant, it was possible to obtain a fuel cell separator in 180 seconds.

Various evaluation tests were carried out on the fuel cell separators obtained in Examples 8 and 9 and in Comparative Examples 9 to 11. The results are shown in Table 3.

TABLE 3

|  |  | Example | | | Comparative Example | | |
| --- | --- | --- | --- | --- | --- | --- | --- |
|  |  | 1 | 8 | 9 | 9 | 10 | 11 |
| Accelerator | Name of compound | 2-phenyl-imidazole | 2-phenyl-4-methyl-imidazole | 1-benzyl-2-methyl-imidazole | 2-ethyl-4-methyl-imidazole | 2-phenyl-4,5-dihydroxy-methyl-imidazole | triphenyl-phosphine |
|  | Molecular weight | 144 | 158 | 172 | 110 | 204 | 262 |

TABLE 3-continued

|  |  | Example | | | Comparative Example | | |
|---|---|---|---|---|---|---|---|
|  |  | 1 | 8 | 9 | 9 | 10 | 11 |
| Separator | Molding time (s) | 30 | 30 | 30 | 30 | 600 | 180 |
|  | Glass transition point (° C.) | 150 | 154 | 151 | *1 | 138 | 130 |
|  | Initial flexural strength (MPa) | 55 | 53 | 55 |  | 45 | 53 |
|  | Strength retention (%) (168 hrs immersion in 90° C. water) | 98.2 | 97.5 | 97.4 |  | 93.2 | 96.7 |
|  | Strength retention (%) (1,500 hrs immersion in 90° C. water) | 96.0 | 95.3 | 95.5 |  | —*2 | 94.3 |
|  | Strength retention (%) (3,000 hrs immersion in 125° C. water) | 93.7 | 92.9 | 93.1 |  | —*2 | 89.3 |

*1: Separator could not be obtained
*2: Not measurable because strength retention after 168 hours immersion at 90° C. was below 95%.

As shown in Table 3, the fuel cell separators obtained in Examples 8 and 9 had glass transition points of at least 140° C., a flexural strength retention after 1,500 hours immersion in 90° C. water of 95 to 98%, and a flexural strength retention after 3,000 hours immersion in 125° C. water of 92 to 95%. It is apparent from these results that the resistance to both heat and hot water was excellent, and that the fuel cell separators were able to maintain their strength for an extended period of time.

By contrast, in Comparative Example 9, because the imidazole compound had a molecular weight below 140, the composition had a poor thermal stability. During molding of the fuel cell separator, curing reactions arose suddenly inside the mold, as a result of which the composition did not flow uniformly, making it impossible to obtain a fuel cell separator.

In Comparative Example 10, because the imidazole compound had a molecular weight above 180, compatibility with the epoxy resin was poor, and so the crosslink density was low. As a result, the glass transition temperature was low, resulting in poor flexural strength retentions following immersion in 90° C. and 125° C. water.

In Comparative Example 11, because triphenylphosphine was used as the cure accelerator, the glass transition point was low and the flexural strength retentions following immersion in 90° C. and 125° C. water were low.

In addition, it is apparent that not only did the fuel cell separators obtained in Examples 1, 8 and 9 according to the invention have an excellent resistance to both heat and hot water, they could be produced in a short molding time of 30 seconds.

Here, the change over time in strength retention for the examples of the invention and the comparative examples, after converting the times in the above strength retention tests to the corresponding times at a fuel cell operating temperature of 75° C., is shown in Table 1.

As shown in FIG. 1, relative to the comparative examples, it is apparent that the initial decline after about one month in the strength retentions in Examples 1 to 9 is suppressed and that the degree of decline does not change much from the half-year point to even after more than 1 year. Even at year 11, the strength retention remains at 92 to 95%.

The invention claimed is:

1. A fuel cell separator obtained by curing a composition comprising:
    a binder component resin comprised of a cresol novolak epoxy resin having a hydrolyzable chlorine content of at most 450 ppm and an epoxy equivalent weight of 192 to 210 g/eq, a phenolic resin having a hydroxyl equivalent weight of 103 to 106 g/eq and an imidazole compound having a molecular weight between 140 and 180; and
    a graphite material,
    wherein the separator has a glass transition point between 140 and 165° C.

2. The fuel cell separator according to claim 1, wherein the hydrolyzable chlorine content is from 370 to 450 ppm.

3. The fuel cell separator according to claim 1, wherein the cresol novolak epoxy resin has an ICI viscosity at 150° C. of from 0.15 to 1.10 Pa·s.

4. The fuel cell separator according to claim 1 which has a strength retention after 3,000 hours immersion in 125° C. water of between 92 and 95%.

5. The fuel cell separator according to claim 1 which has a strength retention after 1,500 hours immersion in 90° C. water of between 95 and 98%.

6. The fuel cell separator according to claim 1, wherein the imidazole compound is an aromatic ring-containing imidazole compound.

7. The fuel cell separator according to claim 1 which contains from 21 to 33 parts by weight of the binder component resin per 100 parts by weight of the graphite material.

* * * * *